Patented Aug. 19, 1952

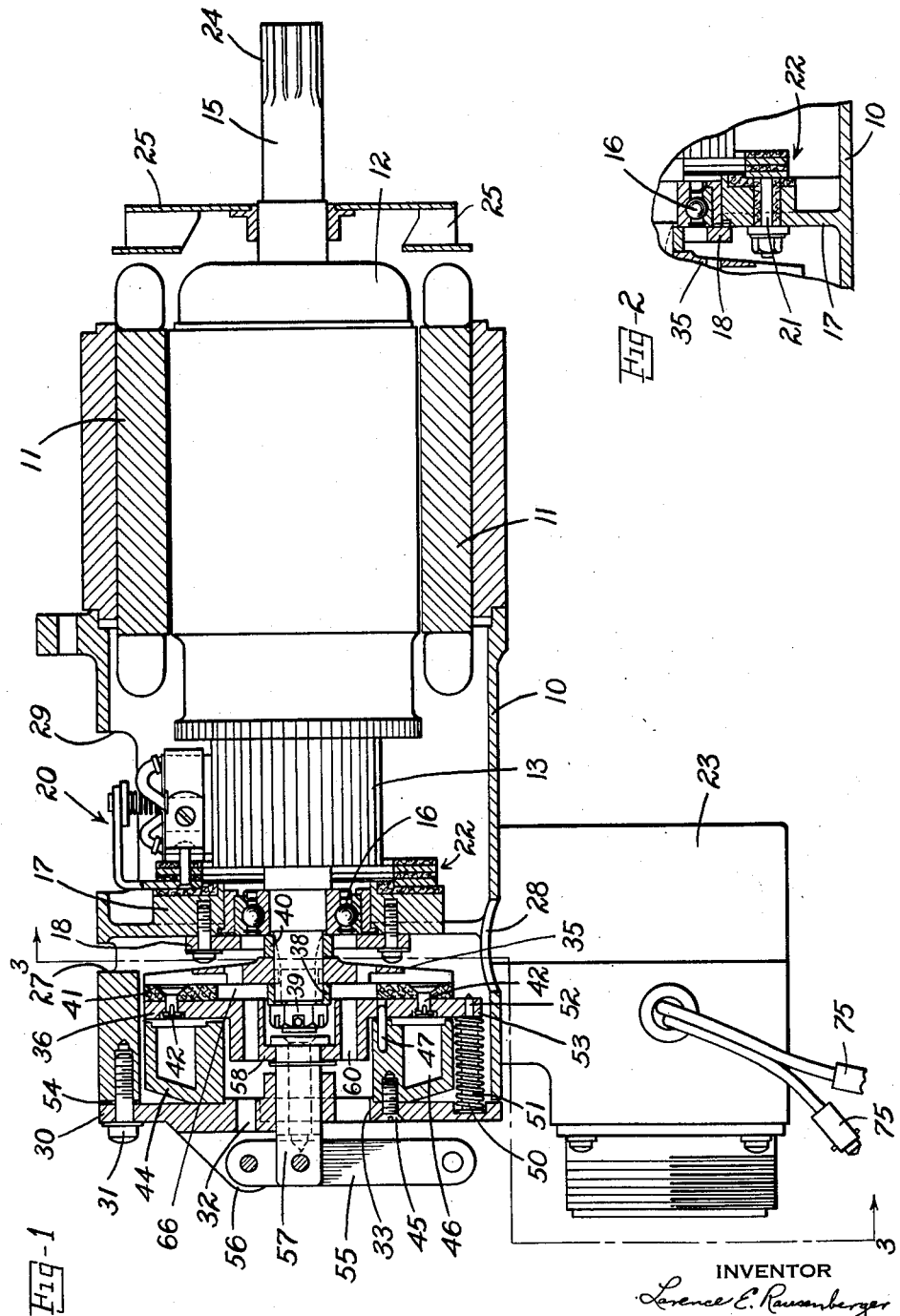

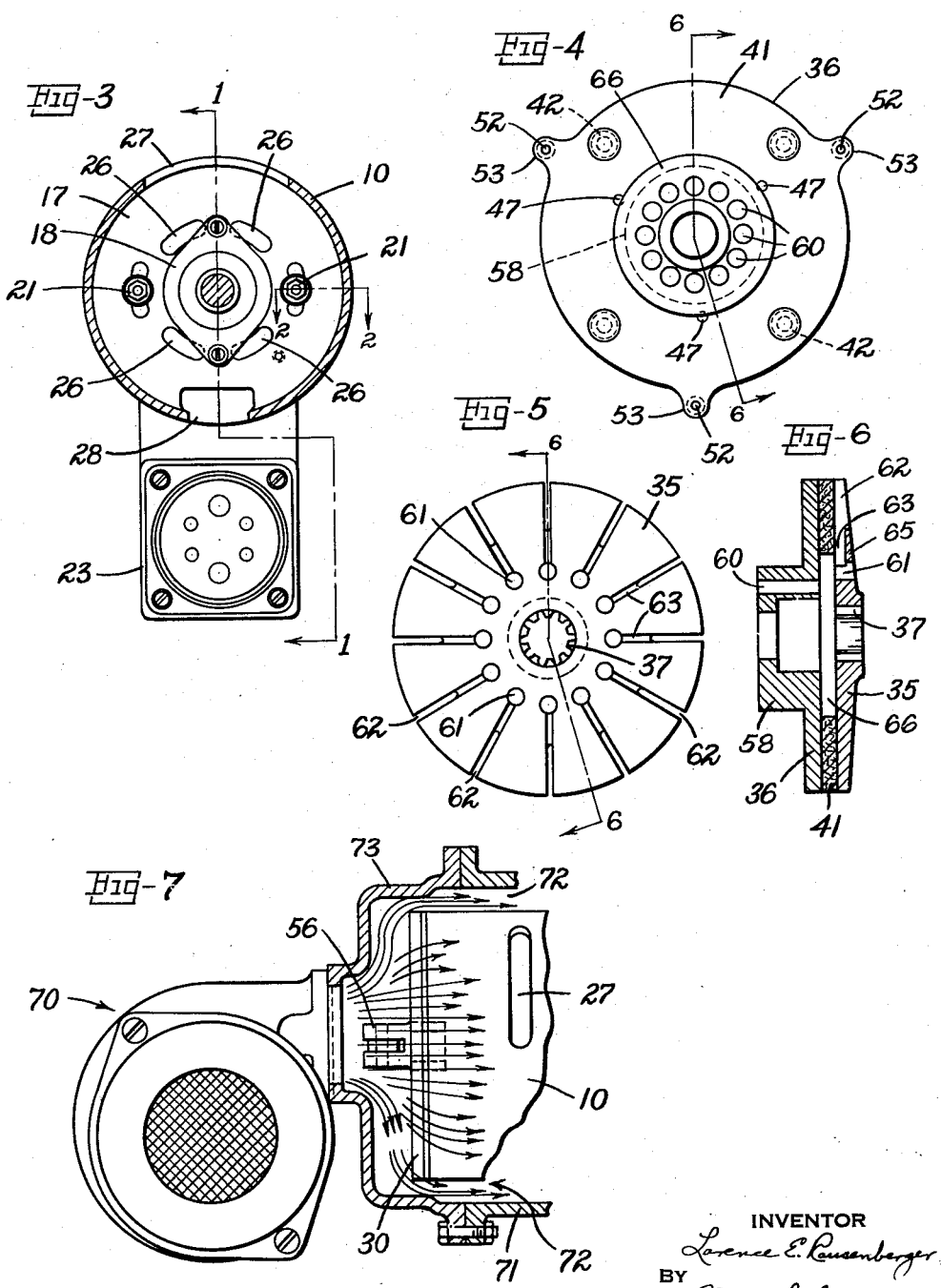

2,607,445

UNITED STATES PATENT OFFICE 2,607,445

BRAKING MECHANISM

Larence E. Rausenberger, Springfield, Ohio, assignor to The Steel Products Engineering Company, Springfield, Ohio, a corporation of Ohio Application March 31, 1948, Serial No. 18,160

7 Claims. (Cl. 188—264)

This invention relates to brakes, and more particularly to brakes for braking a rotating shaft.

One of the principal objects of the invention is to provide a brake of simple, compact and lightweight construction which can be mounted in a limited space and which will operate effectively and efficiently to develop a high braking force for quickly and safely stopping a shaft rotating at high speeds under conditions tending to generate considerable heat during the braking period.

An additional object is to provide a rotary brake member for such a brake which has outwardly extending slots in the braking surface thereof for causing an outward flow of cooling air from the cooperating brake members effective to dissipate the heat evolved during braking.

Another object is to provide such a brake wherein the cooperating brake members have cooperating slots and passages therein for facilitating the transmission of cooling fluid therethrough to effect rapid dissipation of the heat generated during application of the braking force.

It is also an object of the invention to provide a brake and motor assembly in a simple and compact housing having slots and passages therethrough for directing a controlled flow of cooling fluid through and around the brake and motor to promote rapid cooling in use.

Other objects and advantages will be apparent from the following description, the accompanying drawings and the appended claims.

In the drawings—

Fig. 1 is a view in vertical section through a motor housing and brake assembly constructed in accordance with the present invention, the section being on the line 1—1 of Fig. 3;

Fig. 2 is a fragmentary section on the line 2—2 of Fig. 3;

Fig. 3 is a section on the line 3—3 of Fig. 1;

Fig. 4 is a detail elevational view of the braking face of the stationary brake member;

Fig. 5 is a similar view of the braking face of the rotary brake member;

Fig. 6 is a section through the cooperating brake members on the line 6—6 of Figs. 4 and 5 showing the brake members in engagement; and Fig. 7 is a fragmentary view illustrating the use of an auxiliary blower for supplying cooling air to the assembly of Fig. 1.

In the drawings, which illustrate a preferred embodiment of the invention, the housing 10 supports the stator 11 of an electric motor which includes a rotor or armature 12 and commutator 13 mounted on the rotor shaft 15. The inner end of shaft 15 is mounted in a ball bearing 16 supported in a web portion 17 of the housing and held in position by an annular plate 18 bolted to web 17. The brush carrier indicated generally at 20 is also secured to the housing web 17 by means of insulated bolts 21 (Fig. 2) and insulating gaskets 22. The operating current is supplied to the motor by way of suitable leads, not shown, to the receptacle box 23 secured to housing 10.

This motor unit is particularly adapted for use under conditions requiring the handling of heavy loads at high speed, the outer end of shaft 15 being shown as splined at 24 for connection to a load. The invention has special application where it is desired to keep the size and weight of the unit within relatively low limits, the particular unit shown in Fig. 1 having been designed for operating a bomb hoist on an aircraft, an installation requiring high load carrying and braking capacity coupled with minimum size and weight. Since such operating conditions give rise to substantial heat when the motor is running and also while it is being braked, special provision is made for rapid and effective cooling of both the motor and the brake.

The outer end of the shaft 15 carries a fan 25 for drawing cooling air axially through the motor, and the housing web 17 is provided with a plurality of slots 26 for the passage of air. The housing 10 is also formed with ventilating slots 27, 28 and 29 in its outer periphery which aid in the ventilation of the motor and brake. The end of the housing opposite the motor carries an end plate 30 bolted thereto at 31 and similarly provided with ventilating passages 32 and 33.

The brake assembly for rotor shaft 15 includes a rotary brake member or brake disk 35 carried by the shaft and a complementary non-rotary brake member or brake plate 36 supported against angular movement in the housing 10. Brake disk 35 is splined to shaft 15 at 37 and is held axially thereon between a nut 38 and cap washer 39 at the end of the shaft and a spacer 40 adjacent bearing 16. The brake plate 36 carries an annular brake lining 41 of fiber or other suitable material secured thereto by rivets 42. Satisfactory results have been obtained with the brake disk 35 formed of stainless steel and the brake plate 36 formed of machine steel.

The brake plate 36 is supported by an electromagnet 44 bolted to the end plate 30 at 45 and held thereby against angular movement with respect to housing 10, the windings of magnet 44 being indicated at 46. A plurality of dowel pins 47 (Figs. 1 and 4) are press fitted in the magnet and have sliding fit in suitable receiving bores in brake plate 36, thus providing for axial movement of the brake plate with respect to brake disk 35 but preventing angular movement of the brake plate with respect to housing 10.

When electromagnet 44 is energized, it will draw the brake plate 36 to the left as viewed in Fig. 1 and thus out of braking engagement with brake disk 35. When the electromagnet is deenergized, braking engagement of the brake members is effected by means of a plurality of springs 50, three being shown, supported by guide pins 51 and 52, which are mounted respectively in suitable recesses in end plate 30 and in radially projecting ear portions 53 of brake plate 36. The total axial movement of the brake plate 36 is relatively small, satisfactory results having been obtained with this movement of the order of 0.012 to 0.015 inch. This may readily be provided for in assembling the device by employing suitable spacers 54 between end plate 30 and the housing 10 of such thickness as to give a clearance of this range between magnet 44 and the brake plate when the magnet is deenergized.

To assure prompt application of the brake with relation to the operation of the motor, the operating circuits for the motor and for electromagnet 44 may be interconnected in such manner that when the motor is energized, the magnet will be simultaneously energized to draw the braking members out of braking engagement, and similarly when the motor is deenergized, the magnet will be simultaneously deenergized to permit springs 50 to effect the desired engagement of the brake members. In addition, manual disengagement of the two brake members may be effected by means of a handle or lever 55, which is pivoted in a pair of yoke arms 56 on the outer side of end plate 30 and connected by means of a slidable shaft or stud 57 with the hub portion 58 of brake plate 36.

In order to promote rapid cooling of the brake members in use, the brake plate 36 is formed with a plurality of axially arranged air passages 60 extending completely therethrough inwardly of the annular lining 41, as shown in Figs. 1, 4 and 6. The brake disk 35 is formed with similar axially arranged air passages 61 extending therethrough as shown in Figs. 5 and 6. In addition, brake disk 35 is formed with a plurality of radially arranged slots 62 extending outwardly from the passages 61 to the outer periphery thereof. The radially outer portions of these slots 62 extend completely through brake disk 35 as shown in Fig. 6, but the radially inner portions of the slots extend only partially through the disk from the braking surface thereof, as indicated at 63, to leave web portions 65, the inner ends of these slot portions and the passages 61 being located radially inwardly of the brake lining 41 to communicate with the annular space 66 between lining 41 and the shaft when the two brake members are in relative braking engagement.

In operation, when the motor is energized, the electromagnet 45 is also energized to effect axial movement of the brake plate 36 away from brake disk 35 and thus to release the brake. While the motor is running, the brake disk will act as a cooling fan for the brake, an outward flow of air being effected through the slots 62—63 which in turn tends to induce an axial flow of air through the passages 60 and 61, the slots 27 and 28 facilitating discharge of air from the housing. In addition, the fan 25 will draw an axial flow of cooling air through the housing and motor to cool the motor windings, this air being supplied through the passages 32 and 33 in the end plate 30 and through the central aperture of the magnet 44 as well as through the slot 29 in housing 10, and since a part of this flow will also pass through the passages 60 and 61, it will further promote cooling of the brake members.

When the motor is deenergized, the magnet 44 is similarly deenergized to release brake plate 36, and the springs 50 will immediately urge the brake plate into frictional engagement with brake disk 35, which is still rotating both because of the inertia of the motor 12 and also as a result of the torque applied by whatever load is on shaft 15. As soon as the brake lining 41 of the brake plate is in contact with brake disk 35, the braking action begins and continues until shaft 15 is completely stopped.

Since the brake disk will continue to rotate until completion of the braking action, it will continue to act as a cooling fan as described. Thus air will continue to be forced outwardly through the slots 62—63 so long as disk 35 is rotating, and since this flow of air is effectively through the body of the brake disk, it will dissipate the heat from the disk. Additional cooling is afforded by the inward flow of air through the passages 60 and 61 to the annular space 66 between brake lining 41 and the shaft, these passages and the space 66 thus serving to supply air for outward flow through slots 62—63. The partial slots 63 act to draw air from the passages 61 and space 66, and further the web portions 65 left by the partial slots contribute substantial strength and rigidity to the disk during braking action. It will also be noted that since the metal body of the disk is in contact with the lining 41 of the brake plate, it tends to absorb the frictional heat from the lining, and this heat is in turn dissipated by the outward air flow through slots 62—63, thus quickly and substantially uniformly cooling both the brake members.

This arrangement accordingly makes possible effective and efficient high speed braking action while at the same time providing for the construction of the brake and motor within desired limits of weight and size and providing a simple and compact construction. Thus with the brake disk 35 of a diameter of 3⅜ inches and the other parts in proportion as shown in Fig. 1, this brake has been found satisfactory under conditions requiring braking of one foot pound of torque at a speed of 6,000 R. P. M. for shaft 15.

Fig. 7 shows a modified construction in which a blower 70 is employed for supplementing the action of the brake disk and fan 25 in cooling the brake and motor. As shown, the housing 10 is provided with an auxiliary outer casing 71 of greater inner diameter than the outer diameter of housing 10 to leave a generally annular passage 72 therebetween. The blower 70 is mounted at the end of casing 71 by means of an end cap 73, and operating current may be readily supplied thereto through electric leads 75 (Fig. 1) from the receptacle box 23. With this construction, the blower 70 supplies a continuous flow of air through the housing 10 and the parts therein and also through the passage 72, thus promoting rapid and effective cooling of the motor windings and armature as well as the brake.

While the forms of apparatus herein described constitute preferred embodiments of the invention, it is to be understood that the invention is

What is claimed is:

1. A brake for a rotary shaft comprising a rotary brake member secured to said shaft, a non-rotary brake member mounted in face to face relation with said rotary brake member, means for effecting relative axial movement of said brake members into and out of braking engagement, said rotary brake member including a disk portion arranged for frictional engagement with said non-rotary brake member and having a plurality of relatively narrow slots in the braking surface thereof leaving the major portion of the surface of said disk for said frictional engagement with said non-rotary brake member, the radially outer portions of said slots extending completely through said rotary brake member from the outer periphery thereof, the radially inner portions of said slots extending only partially through said rotary brake member from the braking surface thereof and cooperating with said outer slot portions to cause an outward flow of air through said rotary brake member during rotation thereof to dissipate heat evolved during braking engagement of said brake members.

2. A brake for a rotary shaft comprising a rotary brake member secured to said shaft, a non-rotary brake member mounted in face to face relation with said rotary brake member, means for effecting relative axial movement of said brake members into and out of braking engagement, said rotary brake member including a disk portion arranged for frictional engagement with said non-rotary brake member and having a plurality of passages extending axially therethrough, said disk portion having also a plurality of relatively narrow slots in the braking surface thereof leaving the major portion of the surface of said disk for said frictional engagement with said non-rotary brake member, the radially outer portions of said slots extending completely through said rotary brake member from the outer periphery thereof to positions intermediate said outer periphery and said passages, the radially inner portions of said slots extending only partially through said rotary brake member from the braking surface thereof and extending outwardly from said passages to said outer slot portions for cooperation with said outer slot portions to cause an outward flow of air through said rotary brake member during rotation thereof effective to induce an axial flow of air through said passages for cooling said brake members.

3. A brake for a rotary shaft comprising a rotary brake member secured to said shaft, a non-rotary brake member mounted in face to face relation with said rotary brake member, means for effecting relative axial movement of said brake members into and out of braking engagement, said rotary brake member including a disk portion arranged for frictional engagement with said non-rotary brake member and having a plurality of passages extending axially therethrough, said disk portion also having a plurality of relatively narrow slots in the braking surface thereof extending outwardly from said passages to the outer periphery of said brake member leaving the major portion of the surface of said disk for said frictional engagement with said non-rotary brake member, the radially outer portions of said slots extending completely through said rotary brake member from the the outer periphery thereof to positions intermediate said outer periphery and said passages, the radially inner portions of said slots extending only partially through said rotary brake member from the braking surface thereof and extending outwardly from said passages to said outer slot portions for cooperation with said outer slot portions to cause an outward flow of air through said rotary brake member during rotation thereof to cool said brake members, said non-rotary brake member having passages extending axially therethrough and communicating with said slots for cooperation with said passages through said rotary brake member to supply air to said slots when said braking members are in relative braking engagement.

4. A rotary brake member adapted to be connected to a rotary shaft for rotation therewith and for relative axial movement with respect to a complementary brake member, said rotary brake member including a disk portion arranged for frictional engagement with said non-rotary brake member and having a plurality of slots therethrough, said slots extending through and radially inwardly from the outer periphery of said brake member to cause an outward flow of air through said brake member during rotation thereof to dissipate heat evolved during braking engagement of said brake members, said rotary brake member also having partial slots in the braking surface thereof and positioned radially inwardly of said first named slots and connecting therewith for supplying air to said first named slots, all of said slots being relatively narrow to leave the major portion of the surface of said disk for frictional engagement with non-rotary brake member.

5. A rotary brake member adapted to be connected to a rotary shaft for rotation therewith and for relative axial movement with respect to a complementary brake member including a disk portion arranged for frictional engagement with said non-rotary brake member and said rotary brake member having a plurality of slots in the braking surface thereof extending inwardly from the outer periphery thereof to positions intermediate said outer periphery and the axis of said rotary brake member, the radially outer portions of said slots extending completely through said rotary brake member, the radially inner portions of said slots extending only partially through said rotary brake member from the braking surface thereof and cooperating with said outer slot portions to cause an outward flow of air through said brake member during rotation thereof for cooling said brake members, all of said slots being relatively narrow to leave the major portion of the surface of said disk for frictional engagement with non-rotary brake member, said rotary brake member also having a plurality of passages extending axially therethrough and connecting with the inner ends of said slots for supplying air to said slots when said brake members are in relative braking engagement.

6. A brake assembly for a motor having a rotor shaft, comprising a stationary housing for said motor, said housing including an inner web portion forming a support for said shaft with said shaft extending axially therethrough, a rotary brake member secured to said shaft on the opposite side of said web from said motor, a complementary brake member, means securing said complementary brake member against angular movement in said housing and in face-to-face relation with said rotary brake member, means for effecting relative axial movement of said brake members into and out of braking engagement, said brake members each having a plurality of passages extending axially therethrough, said rotary brake member also having a plurality of slots in the braking surface thereof extending outwardly from said passages to the outer periphery of said brake member for causing an outward flow of air between said brake members effective to induce an axial flow of air through said passages for cooling said brake members, the outer portion of each of said slots extending completely through the periphery of said rotary brake member, the inner portions of said slots extending only partially through said rotary brake member from the braking surface thereof to leave integral web portions for strengthening and stiffening said rotary brake member, and an end plate on said housing, said end plate and said web having passages extending axially therethrough for transmitting air in generally axial flow to said brake members.

7. A brake assembly for a motor having a rotor shaft, comprising a stationary housing for said motor, said housing including an inner web portion forming a support for said shaft with said shaft extending axially therethrough, a rotary brake member secured to said shaft on the opposite side of said web from said motor, a complementary brake member, means securing said complementary brake member against angular movement in said housing and in face-to-face relation with said rotary brake member, means for effecting relative axial movement of said brake members into and out of braking engagement, said brake members each having a plurality of passages extending axially therethrough, said rotary brake member also having a plurality of slots in the braking surface thereof extending outwardly from said passages to the outer periphery of said brake member for causing an outward flow of air between said brake members effective to induce an axial flow of air through said passages for cooling said brake member, the outer portion of each of said slots extending completely through the periphery of said rotary brake member, the inner portions of said slots extending only partially through said rotary brake member from the braking surface thereof to leave integral web portions for strengthening and stiffening said rotary brake member, an end plate on said housing, and a blower mounted adjacent said end plate for directing air in generally axial flow along said housing, said end plate and said web having passages extending axially therethrough for transmitting air from said blower in generally axial flow through said brake members and said motor.

LARENCE E. RAUSENBERGER.

REFERENCES CITED

The following references are of record in the file of this patent:

UNITED STATES PATENTS

| Number | Name | Date |
| --- | --- | --- |
| Re. 21,497 | Trombetta | Oct. 30, 1934 |
| 878,454 | Caillet | Sept. 10, 1907 |
| 1,588,305 | Buisson | June 27, 1923 |
| 1,853,864 | Kingston | Apr. 12, 1932 |
| 1,987,194 | Kingston | Jan. 8, 1935 |
| 2,048,420 | Babel | July 21, 1936 |
| 2,163,884 | La Brie | June 27, 1939 |
| 2,204,807 | McCune | June 18, 1940 |
| 2,218,614 | McCune | Oct. 22, 1940 |
| 2,262,709 | Lambert | Nov. 11, 1941 |
| 2,481,028 | Lear | Sept. 6, 1949 |